US006938852B1

(12) United States Patent
Graham

(10) Patent No.: US 6,938,852 B1
(45) Date of Patent: Sep. 6, 2005

(54) FLYING CRAFT TETHERED TO POWERED WATER VEHICLE

(76) Inventor: Neil Graham, 5365 El Arbol Dr., Carlsbad, CA (US) 92008

( * ) Notice: Subject to any disclaimer, the term of this patent is extended or adjusted under 35 U.S.C. 154(b) by 0 days.

(21) Appl. No.: 10/808,639

(22) Filed: Mar. 24, 2004

(51) Int. Cl.$^7$ .............................................. B64C 37/00
(52) U.S. Cl. .............................. 244/2; 244/50; 440/33
(58) Field of Search ................................ 244/2, 50, 63; 440/33, 42

(56) References Cited

U.S. PATENT DOCUMENTS

| 1,825,363 | A | | 9/1931 | Robertson .................... 434/37 |
| 1,838,354 | A | * | 12/1931 | Rauer ........................ 244/23 R |
| 1,910,655 | A | | 5/1933 | Traver .......................... 434/37 |
| 1,927,938 | A | | 6/1933 | Huffman ................... 434/37 X |
| 2,493,482 | A | | 1/1950 | Fish ............................. 343/37 |
| 2,576,294 | A | | 11/1951 | Geraci ...................... 244/45 R |
| 2,921,756 | A | * | 1/1960 | Borden et al. ................. 244/2 |
| 3,991,487 | A | | 11/1976 | Bede ......................... 244/2 X |
| 4,417,706 | A | | 11/1983 | Miller ........................... 244/2 |
| 5,082,198 | A | | 1/1992 | Patel ............................. 244/2 |
| 5,094,638 | A | * | 3/1992 | Kobayashi ................... 440/33 |

FOREIGN PATENT DOCUMENTS

WO    WO 91/12172    8/1991

* cited by examiner

Primary Examiner—Galen Barefoot
(74) Attorney, Agent, or Firm—Knobbe, Martens, Olson & Bear, LLP

(57) ABSTRACT

A flying vehicle assembly apparatus comprises a winged flying craft and a powered craft for propelling the flying craft and a tether assembly comprising one or more first rigid struts having a first end pivotally secured to first biased pivot connections adjacent to the flying craft and a second end pivotally secured to second biased pivot connections, and one or more second rigid struts having a first end pivotally secured adjacent to the powered craft and a second end pivotally secured to a second biased pivot connection. The first and second biased pivot connections urge the flying craft and the powered craft toward one another, and whereby during flying operation, the powered craft is generally forward of the flying craft.

29 Claims, 4 Drawing Sheets

FLYING CRAFT TETHERED TO POWERED WATER VEHICLE

FIELD OF THE INVENTION

The apparatus described herein is related to a winged flying craft which is tethered to a powered craft, preferably a water vehicle. The powered craft is operated by a user from the flying craft.

BACKGROUND OF THE INVENTION

A number of tethered flying crafts powered with a land or water propelled vehicles have been proposed. Examples of such driven vehicles are disclosed in U.S. Pat. Nos. 1,825,363; 4,417,706; and 5,082,198. The apparatus described in the aforesaid patents require complex tether assemblies incorporating a plurality of rods or poles having one end attached to the flying craft and the other end to the powered craft. It is to the improvement of such tethered flying vehicle assemblies that the present apparatus is directed.

SUMMARY OF THE INVENTION

The apparatus described herein is an assembly including a winged flying craft having a cabin for accompanying an operator, and a powered vehicle to which it is tethered, preferably a water driven vehicle.

DETAILED DESCRIPTION OF THE PREFERRED EMBODIMENT

Figure 1:
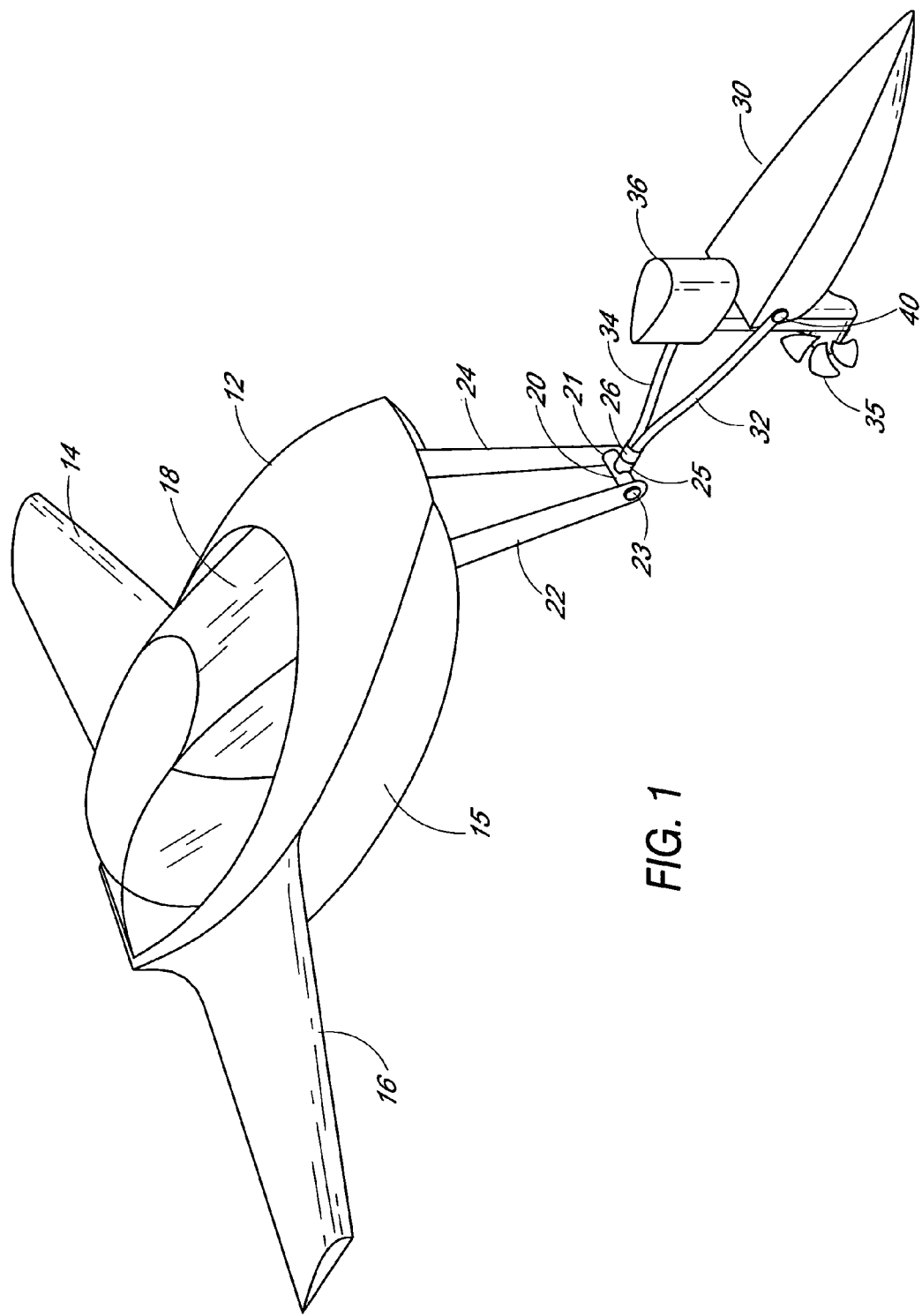
FIG. 1 is a perspective view of the flying vehicle assembly showing the winged flying craft, a powered craft for operating the assembly and the tether assembly.
Figure 2:
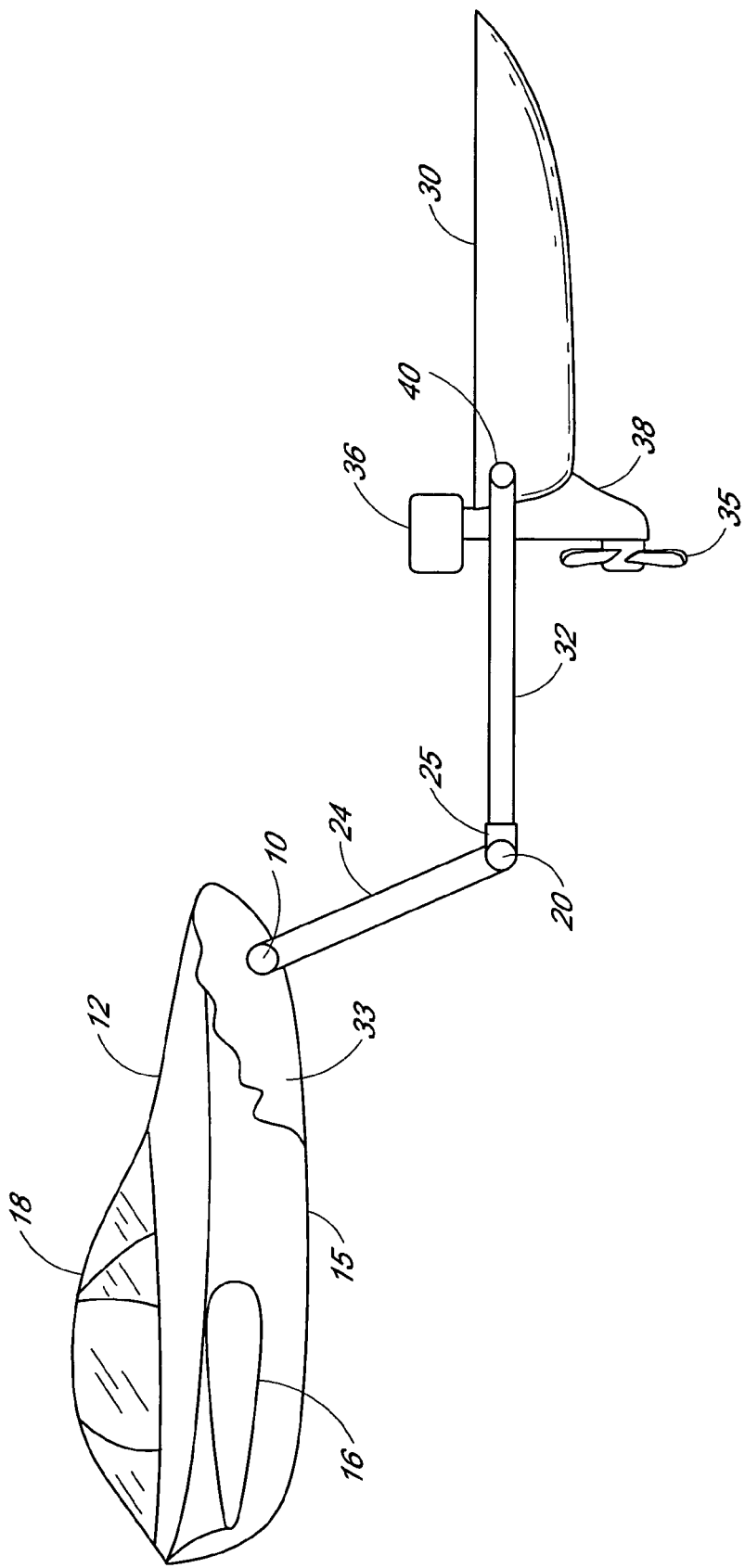
FIG. 2 is a side view of the assembly of FIG. 1 partially cutaway illustrating the tether assembly and biased hinges.

Referring to FIGS. 1 and 2, the flying vehicle assembly is shown comprising a winged flying craft 12 having wings 14 and 16 on each side of the body 15 of the flying craft. The wings are preferably each attached to the sides of the body of the flying craft, and rearwardly of the center of the body of the flying craft. The center of the flying craft is defined herein as the center of gravity of the flying craft, and is forward of the center of lift of the flying craft, the later being over the wings. Thus, the center of lift of the flying craft is along an axis extending through both of the wings, typically through the wing tips, thus, the center of gravity is forward of the wings and the center of lift is aft or to the rear of that position.

The apparatus includes a powered craft 30, preferably a water going vehicle provided with a motor 36 which drives a propeller 35 for powering the craft through the water. Although a land traveling vehicle could also be used, because of land traffic congestion and limited areas where such an apparatus could be used, the water powered craft is preferred. The powered craft includes a rudder 38 and the operation of the motor and rudder are controlled from the flying craft 12 by an operator positioned in a cockpit 18. Specific controls, including electronic and radio control features known to those skilled in the art, may be used and are not described in detail herein.

A tether assembly for attaching the flying craft and a powered craft comprises first rigid struts 22 and 24 and second rigid struts 32 and 34. Preferably, two first rigid struts and two second rigid struts are used, although one or more first rigid struts and one or more second rigid struts could be used in the tether assembly. In the preferred embodiment illustrated, first rigid struts 22 and 24 are secured to the flying vehicle on its underside, forward of the wings and also forward of the center of gravity of the flying craft. One end of each of the first rigid struts 22 and 24 is secured to the flying craft at a pivot connection or hinge. Observing FIG. 2, one end of rigid strut 24 is secured to flying craft 12 at pivot connection 10. The pivot position is preferably at the forward underside of the flying craft, and aft of the nose of the flying craft, and forward of the center of gravity. The end of each rigid strut opposite the end attached to the flying craft is secured at a second pivot connection. Observing FIG. 1, the preferred embodiment illustrates rigid struts 22 and 24, each secured to a pivot pin 20, strut 22 secured thereto at pivot pin 23 and strut 24 at pivot connection 21. The pivot connections at the ends of the respective struts may include bearings, e.g., journaled bearings, ball or roller bearings, seals, gaskets, bushings, pivot pins or bolts, and other suitable components known to those skilled in the art.

One end of each of the second rigid struts 32 and 34, in the preferred embodiment illustrated, are attached to a connector 26 which is rotatably or pivotally secured to a tee pin 25. The tee-pin may be integral with or otherwise fixedly attached to connector 26. Alternatively, connector 26 and pivot pin 20 may be designed with a cooperating pivot connection between them. Opposite ends of the second rigid struts 32 and 34 are secured to the hull of powered craft 30 by suitable means such as a pivot pin 40 as illustrated. Preferably, the ends of the second rigid struts 32 and 34 are secured to the powered craft at pivot connections so that the powered craft is free to move or pivot along a vertical plane relative to a horizontal plane extending through both of the rigid struts 32 and 34. Moreover, in the preferred embodiment illustrated, with the ends of the second rigid struts 32 and 34 pivotally secured to a pin 25, powered craft 30 is also able to rotate relative to first rigid struts 22 and 24 and flying craft 12.

Other equivalent means for securing the ends of second rigid struts may be used. For example, the ends of struts 32 and 34 may be secured to a yoke device which is attached to the powered craft. Such a yoke may be hinged to the powered craft, and may also provide pivotal or rotatable attachment for the second struts relative to the yoke and/or powered craft. The opposite ends of the second struts may each be attached to separate hinges or pivot connections rather than commonly secured to a connector as illustrated. For example, each end of the struts 32 and 34 may be secured to a different pivot connection, e.g., strut 32 to pivot pin 23 and strut 34 to pivot connection 21. However, pivots and/or rotatable attachment of the second struts relative to the powered craft is preferred as is hinged and/or rotatable or pivotal attachment relative to the ends of the first rigid struts.

In a further preferred embodiment, pivot components connecting the first rigid struts 22 and 24 at the flying craft (pivot connection 10) are biased as are the pivot connections 21 and 23 cooperating with pivot pin 20, whereby both ends of each of the first rigid struts 22 and 24 are biased. The pivots connecting the ends of second rigid struts 32 and 34 may or may not be biased. However, it may be preferable to bias the rotatable connection between connector 26 and pin 25 whereby rigid struts 32 and 34 are biased along a horizontal plane. For example, one or more biasing springs cooperating with connector 26 and pin 25 may be used to urge the components to resist any angular rotation thereby urging vertical alignment of the flying craft with the powered craft. Spring biased hinges or pivots may be used for such purpose.

Figure 3:
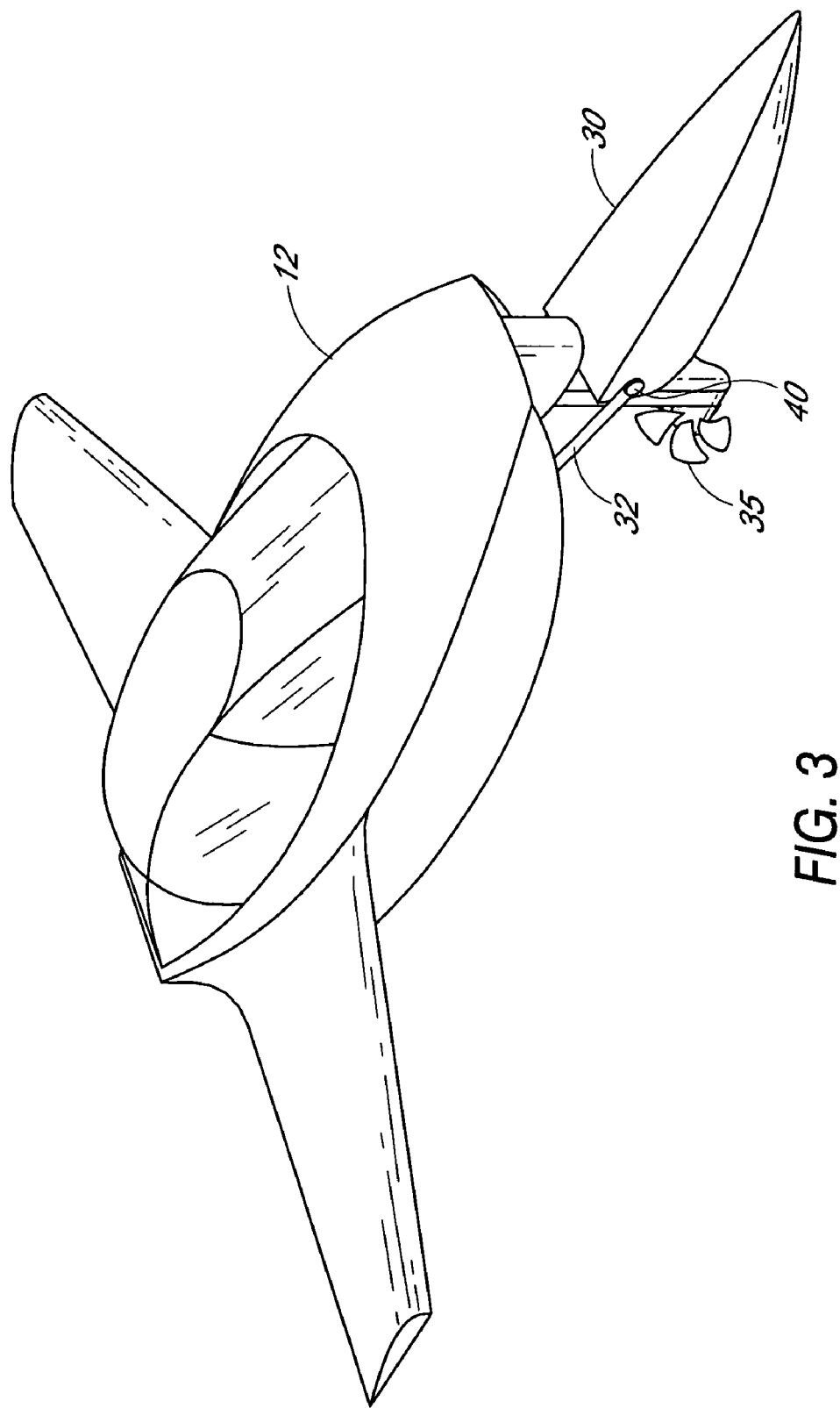
FIG. 3 is a perspective view of the assembly shown in FIG. 1 in an unpowered or rest condition.
Figure 4:
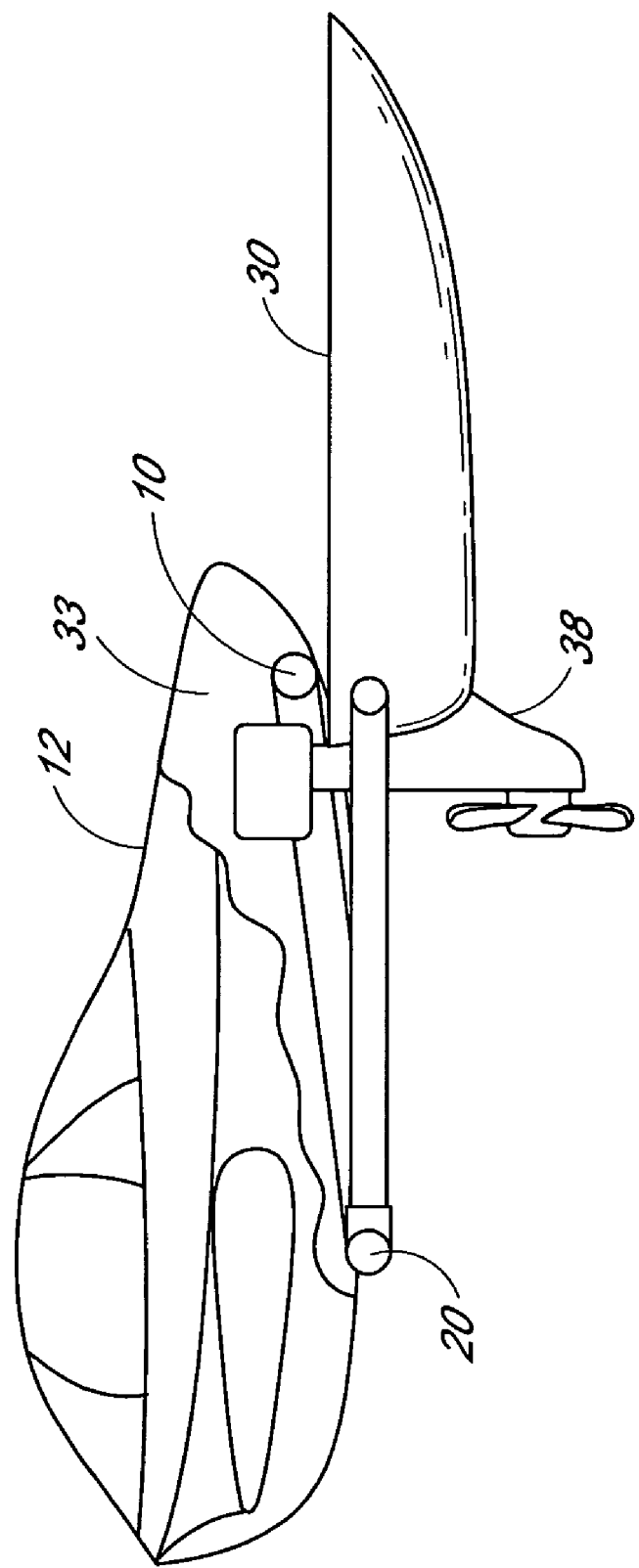
FIG. 4 is a side view of the assembly of FIG. 3, partially cutaway to show the tether assembly components in a folded position.

The bias at pivot connections 10 and 20 is such as to provide a scissor-like effect between the first rigid struts 22 and 24 and the second rigid struts 32 and 34. These two pivot positions are biased so that the first rigid struts 22 and 24 are urged to the aft of the flying craft whereby pin 20 is urged rearwardly of the apparatus. Preferably, pivot pin 20 is also biased to urge pivot connection 25 rearwardly of the apparatus. Thus, in the most preferred embodiment, with these two pivot positions so biased, the tether assembly is biased to urge the first and second rigid struts to form an acute angle relative to pivot pin 20. Such a biased position will result in a relative positioning of the flying craft and powered craft as shown in FIGS. 3 and 4. It will also be observed that with the preferred biasing of pin 25, the relationship of powered craft 30 relative to flying craft 12 in the illustrated position is also enhanced. Biasing of the pivot connections preferably uses spring biasing components which may be attached to the pivot connector components and/or to the struts. The specific design of the biasing components and the biased connectors is not critical as long as the intended operation is achieved.

As also illustrated in FIGS. 3 and 4, the underside of flying craft 12 is also preferably recessed or shaped so as to form a cavity 33 for receiving a portion of the powered craft in a non-operating or pre-flight condition. In such a condition, with the flying craft and powered craft closest together, and in a type of nested configuration, storage, trailering or other transporting, and prior to launching operation are improved and facilitated.

In operation, the flying vehicle assembly apparatus shown may be launched by directing each of the craft into the water at a convenient launch site. Preferably, the flying craft is also watertight and shaped so as to minimize resistance of the flying craft as it is pulled through the water, at least for a short distance during initial takeoff. To initiate takeoff, an operator will control the direction and speed of the powered craft 30 sufficiently whereby at a certain speed, the winged flying craft will become airborne. During this takeoff phase, the acute angle between the first rigid struts and second rigid struts will increase as the winged flying craft is first pushed in a forward direction by the powered craft via the struts, and thereafter pulled along the direction of travel by the operation of the powered craft, again via the struts. In a straight direction of travel, the vertical plane of the powered craft and flying craft will be substantially the same, and the flying craft will be positioned above and rearwardly of the powered craft along this vertical plane. The elevation of the flying craft above the water will depend on the speed of the powered craft and the length of the rigid struts. An operator may control the direction of the powered craft, whereby altitude of the flying craft may also change as the direction is changed. As change of direction of powered craft 30 is continued, so will the direction of the flying craft as it is pulled along the new direction by the rigid struts. With at least one of the connections along the tether assembly as previously described, the flying craft may also be banked during a turn.

The wings of the flying craft may be provided with flaps for operation so that the operator may increase or decrease the elevation of the flying craft or distance above the water somewhat, without unduly interfering with the overall operation of the apparatus. For example, especially during takeoff or landing, such flaps may be of assistance in improving takeoff thereby reducing the strain and speed of the powered craft for lifting the flying craft. Similarly, such flaps may also assist in lowering the flying craft, independently of the speed of the powered craft.

What is claimed is:

1. A flying vehicle assembly apparatus comprising:
   a winged flying craft for flying generally along a first axis and one or more first biased pivot connections cooperating therewith;
   a powered craft for traveling generally along a second axis generally coplanar with said first axis for propelling said flying craft;
   one or more second biased pivot connections cooperating with a tether assembly;
   a tether assembly comprising one or more first rigid struts having a first end pivotally secured to said one or more first biased pivot connections adjacent to said flying craft and a second end pivotally secured to one of said one or more second biased pivot connections, and one or more second rigid struts having a first end pivotally secured adjacent to said powered craft and a second end pivotally secured to a second biased pivot connection, whereby said first and second biased pivot connections urge said flying craft and said powered craft toward one another along said first and second axes, and whereby during flying operation the powered craft is generally forward of said flying craft; and
   wherein an underside of said flying craft is shaped to receive a portion of said powered craft in a nested position therewith; and wherein said first and second biased pivot connections are spring biased for urging said powered craft in nested position with said flying craft.

2. An apparatus of claim 1 wherein said powered craft is controlled from said flying craft.

3. An apparatus of claim 1 wherein said flying craft has a forward end and a wing extending on each side of said flying craft rearwardly of said forward end with a lift axis defined along said wings, and wherein said one or more first biased pivot connections are secured to said flying craft at a location forward of said lift axis.

4. An apparatus of claim 2 wherein said flying craft has a forward end and a wing extending on each side of said craft rearwardly of said forward end with a lift axis defined along said wings, and wherein said one or more first biased pivot connections are secured to said flying craft at a location forward of said lift axis.

5. An apparatus of claim 3 wherein the underside of said flying craft includes a recess for receiving said powered craft in said nested position.

6. An apparatus of claim 1 wherein said powered craft comprises a shaped hull for water travel and includes an engine for driving said powered craft through water and includes a controllable rudder for changing direction of water travel.

7. An apparatus of claim 6, wherein said engine and said rudder are controlled from said flying craft.

8. An apparatus of claim 1 wherein said tether assembly is positioned between a first position prior to operating said powered craft whereby said first and second rigid struts form a first angle with one another, and a second position during operation of said powered craft whereby said first and second rigid struts form a second angle with one another.

9. An apparatus of claim 8 wherein said second angle is greater than said first angle.

10. An apparatus of claim 8 wherein said first angle is less than about 45° C.

11. An apparatus of claim 8 wherein said second angle is an obtuse angle.

12. An apparatus of claim 9 wherein said second angle is an obtuse angle.

13. An apparatus of claim 1 wherein said flying craft comprises a wing extending from each side thereof rearwardly from the center of said flying craft and whereby one or more first biased hinges are positioned forwardly from the center of said flying craft.

14. An apparatus of claim 12 wherein the center of gravity of said flying craft is forward of said wings.

15. A flying vehicle assembly apparatus comprising:
a winged flying craft for flying generally along a first axis and one or more first biased pivot connections cooperating therewith;
a powered craft for traveling generally along a second axis generally coplanar with said first axis for propelling said flying craft;
one or more second biased pivot connections cooperating with a tether assembly;
a tether assembly comprising one or more first rigid struts having a first end pivotally secured to said one or more first biased pivot connections adjacent to said flying craft and a second end pivotally secured to one of said one or more second biased pivot connections, and one or more second rigid struts having a first end pivotally secured adjacent to said powered craft and a second end pivotally secured to a second biased pivot connections, whereby said first and second biased pivot connections urge said flying craft and said powered craft toward one another along said first and second axes, and whereby during flying operation, the powered craft is generally forward of said flying craft; and
wherein said tether assembly is positioned between a first position prior to operating said powered craft whereby said first and second rigid struts form a first angle with one another, and a second position during operation of said powered craft whereby said first and second rigid struts form a second angle with one another.

16. An apparatus of claim 15 wherein said powered craft is controlled from said flying craft.

17. An apparatus of claim 15 wherein said flying craft has a forward end and a wing extending on each side of said flying craft rearwardly of said forward end with a lift axis defined along said wings, and wherein said one or more first biased pivot connections are secured to said flying craft at a location forward of said lift axis.

18. An apparatus of claim 16 wherein said flying craft has a forward end and a wing extending on each side of said craft rearwardly of said forward end with a lift axis defined along said wings, and wherein said one or more first biased pivot connections are secured to said flying craft at a location forward of said lift axis.

19. An apparatus of claim 17 wherein an underside of said flying craft is shaped to receive a portion of said powered craft in a nested position therewith.

20. An apparatus of claim 19 wherein the underside of said flying craft includes a recess for receiving said powered craft in said nested position.

21. An apparatus of claim 20 wherein said first and second biased pivot connections are spring biased for urging said powered craft in nested position with said flying craft.

22. An apparatus of claim 15 wherein said powered craft comprises a shaped hull for water travel and includes an engine for driving said powered craft through water and includes a controllable rudder for changing direction of water travel.

23. An apparatus of claim 22 wherein said engine and said rudder are controlled from said flying craft.

24. An apparatus of claim 15 wherein said second angle is greater than said first angle.

25. An apparatus of claim 15 wherein said first angle is less than about 45° C.

26. An apparatus of claim 15 wherein said second angle is an obtuse angle.

27. An apparatus of claim 24 wherein said second angle is an obtuse angle.

28. An apparatus of claim 15 wherein said flying craft comprises a wing extending from each side thereof rearwardly from the center of said flying craft and whereby one or more first biased hinges are positioned forwardly from the center of said flying craft.

29. An apparatus of claim 27 wherein the center of gravity of said flying craft is forward of said wings.

* * * * *